United States Patent [19]

Loev

[11] 3,896,148

[45] July 22, 1975

[54] 1-DIALKYLAMINOALKOXY-5,5-DIPHENYL-2-PYRROLIDINONE COMPOUNDS

[75] Inventor: Bernard Loev, Broomall, Pa.

[73] Assignee: SmithKline Corporation, Philadelphia, Pa.

[22] Filed: Jan. 17, 1974

[21] Appl. No.: 435,132

[52] U.S. Cl. 260/326.5 FL; 260/515 R; 260/515 P; 260/500.5 H; 424/274
[51] Int. Cl............................................ C07d 27/08
[58] Field of Search ........................... 260/326.5 FL

[56] References Cited
OTHER PUBLICATIONS

Clarke et al. Chem. Abs., Vol. 44–7830 b (1950), Abs. of J. Am. Chem. Soc., Vol. 71 : 2821–2825.

*Primary Examiner*—Joseph A. Narcavage
*Attorney, Agent, or Firm*—Janice E. Williams; Alan D. Lourie; William H. Edgerton

[57] ABSTRACT

1-Dialkylaminoalkoxy-5,5-diphenyl-2-pyrrolidinones are prepared by reaction of a 1-hydroxy-5,5-diphenyl-2-pyrrolidinone with an N,N-dialkylaminoalkyl halide. These compounds inhibit gastric acid secretion.

3 Claims, No Drawings

1-DIALKYLAMINOALKOXY-5,5-DIPHENYL-2-PYRROLIDINONE COMPOUNDS

This invention relates to new 1-dialkylaminoalkoxy-5,5-diphenyl-2-pyrrolidinone compounds having pharmacological activity. In particular, these compounds inhibit gastric acid secretion.

The compounds of this invention are represented by the following structural formula:

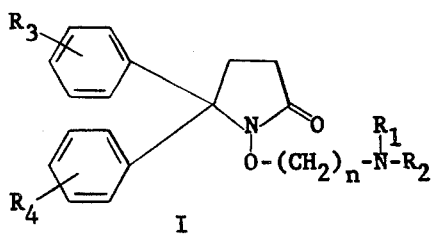

in which:

$n$ is two to four;

$R_1$ and $R_2$ are lower alkyl; and $R_3$ and $R_4$ are hydrogen, halogen, lower alkyl, lower alkoxy or trifluoromethyl.

Preferred compounds of this invention are represented by Formula I in which $R_1$ and $R_2$ are methyl and $n$ is three. An advantageous compound of this invention is the compound 1-[3-(N,N-dimethylamino)propoxyl]-5,5-diphenylpyrrolidin-2-one.

The compounds of this invention are prepared as shown below:

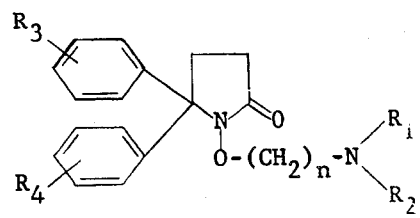

where $R_1$, $R_2$, $R_3$, $R_4$ and $n$ are as defined above and X is halogen, preferably chloro or bromo.

According to the above procedure, a 4,4-diphenyl-3-butenohydroxamic acid is cyclized by treating with acid, such as a sulfonic acid, hydrochloric acid, trifluoroacetic acid, phosphoric acid or, preferably, concentrated sulfuric acid at ambient temperature (ca. 25°) as described in U.S. Pat. application Ser. No. 189,333, now U.S. Pat. No. 3,804,854. An excess of the acid or a solvent as benzene, toluene or ether may be used. Reaction of the product 1-hydroxy-5,5-diphenyl-2-pyrrolidinone with an N,N-dialkylaminoalkyl halide in the presence of a base, for example in a lower alcoholic solution of an alkali metal lower alkoxide (prepared from an alkali metal hydroxide and a lower alcohol) such as sodium ethoxide, gives the compounds of this invention.

The 4,4-diphenyl-3-butenohydroxamic acid starting materials are prepared as follows:

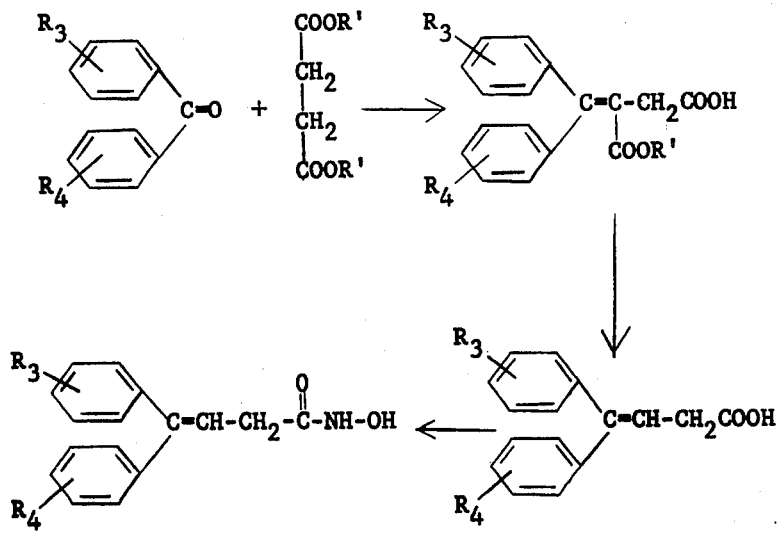

The terms $R_3$ and $R_4$ are as defined above and $R'$ is methyl or ethyl.

According to the above procedure, a benzophenone is reacted with a succinic acid ester in the presence of

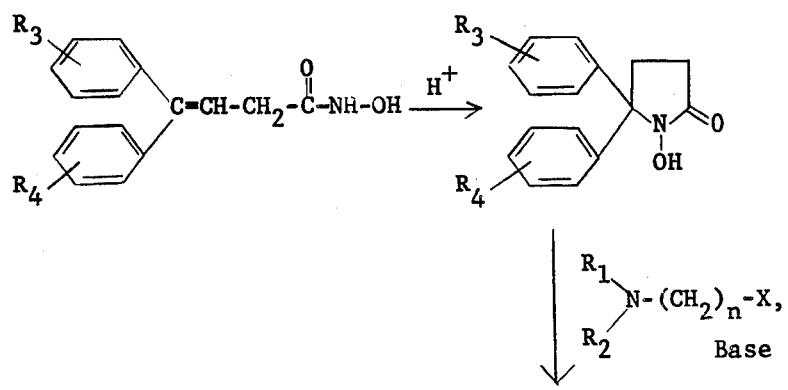

a base (the Stobbe reaction) and the resulting 3-carbalkoxy-4,4-diphenyl-3-butenoic acid is treated with acid such as hydrobromic acid an aqueous acetic acid. The resulting 4,4-diphenyl-3-butenoic acid is converted to the acid chloride by treating with thionyl chloride or to an ester such as the phenyl ester and the acid chloride or phenyl ester is reacted with hydroxylamine to give the 4,4-diphenyl-3-butenohydroxamic acid starting materials.

Alternatively, the butenoic acids may be prepared from an ester prepared via the well known Wittig reaction or analogous procedures:

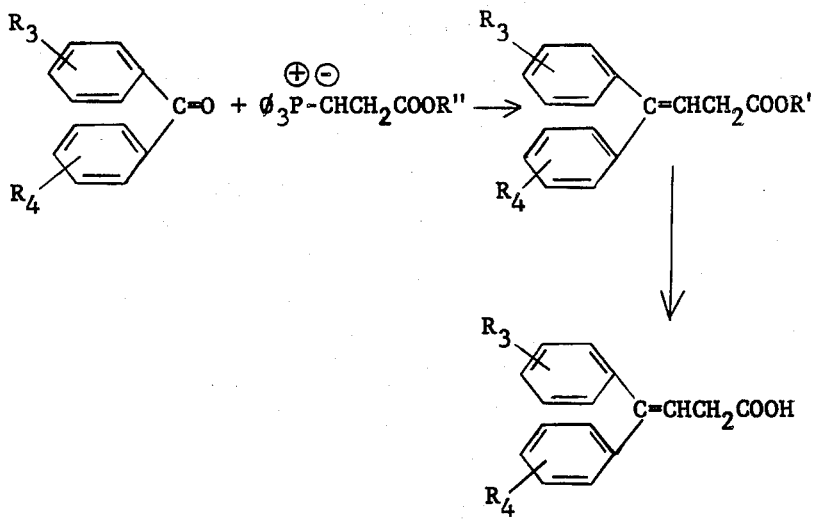

The terms $R_3$ and $R_4$ are as defined above and $R''$ is methyl or ethyl.

Also, the butenoic acids may be prepared by condensation of the appropriate aldehyde with malonic acid in the presence of a basic catalyst:

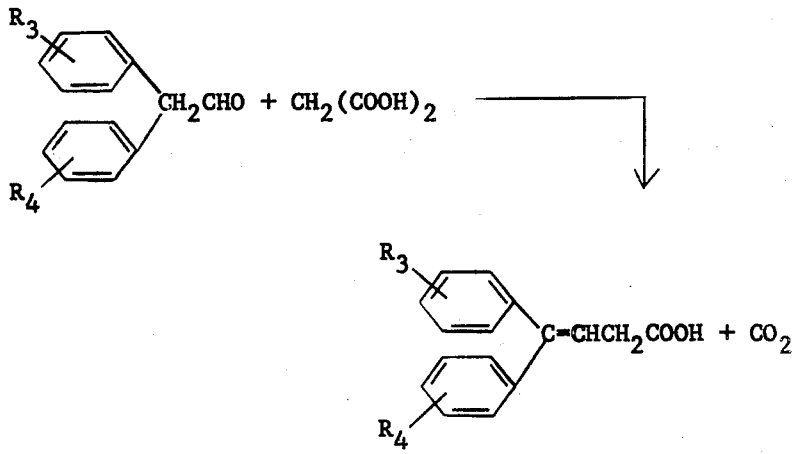

The terms $R_3$ and $R_4$ are as defined above.

The butenohydroxamic acids and butenoic acids, prepared as described above, are written herein as having the double bond at the 3-position. However, under some conditions, these compounds may have the double bond at the 2-position. Both the 2- and 3-butenohydroxamic acids give the same pyrrolidinone products in the synthetic process described herein.

The compounds of this invention produce inhibition of gastric acid secretion. In addition, the compounds have coronary vasodilator activity.

The inhibition of gastric acid secretion is demonstrated by administration to pylorus ligated rats at doses of about 50 mg./kg. orally. Also, this activity is demonstrated by administration to chronic gastric fistula rats (Brodie et al., *Amer. J. Physiol.* 202:812, 1962) at doses of about 50 mg./kg. orally. In these procedures, compounds which produce an increase in gastric pH or a decrease in the volume of gastric juice or both are considered active.

The compounds of this invention are administered internally, for example, parenterally, rectally or, preferably, orally in an amount to produce the desired biological activity.

Preferably, the compounds are administered in conventional dosage forms prepared by combining an appropriate dose of the compound with standard pharmaceutical carriers.

The pharmaceutical carrier may be, for example, a solid or a liquid. Exemplary of solid carriers are lactose, magnesium stearate, terra alba, sucrose, talc, stearic acid, gelatin, agar, pectin, acacia or cocoa butter. The amount of solid carrier will widely be preferably will be from about 25 mg. to about 1 g. Exemplary of liquid carriers are syrup, peanut oil, olive oil, sesame oil, propylene glycol, polyethylene glycol (mol. wt. 200–400) and water. The carrier or diluent may include a time delay material well known to the art such as, for example, glyceryl monostearate or glyceryl distearate alone or with a wax.

A wide variety of pharmaceutical forms can be employed, for example the preparation may take the form of tablets, capsules, powders, suppositories, troches, lozenges, syrups, emulsions, sterile injectable liquids or liquid suspensions or solutions.

The pharmaceutical compositions are prepared by conventional techniques involving procedures such as mixing, granulating and compressing or dissolving the ingredients as appropriate to the desired preparation.

As used herein, the terms "lower alkyl" and "lower alkoxy" denote groups having from one to four carbon atoms and optionally branched; the term "halogen" denotes chloro, bromo or fluoro.

The following examples illustrate the invention but are not to be construed as limiting the scope thereof. Temperatures are in degrees Centigrade unless otherwise indicated.

EXAMPLE 1

4,4-Diphenyl-3-butenoic acid (75 g.) is added to 75 g. of trifluoroacetic anhydride dissolved in one liter of methylene chloride. The resulting mixture is stirred at room temperature for five minutes, then, with stirring, a solution of 350 g. of phenol in 500 ml. of methylene chloride is added. The solution is heated at reflux for two hours, cooled and washed with 5% aqueous sodium bicarbonate solution, then with water, dried and concentrated to give the phenyl ester of 4,4-diphenyl-3-butenoic acid.

The above prepared ester (44 g.) is added to a mixture of 300 ml. of pyridine and 200 ml. of ethanol. To the resulting mixture is added 44 g. of hydroxylamine hydrochloride and the mixture is heated at reflux for 1.5 hours, then concentrated and 500 ml. of cold dilute hydrochloric acid and 300 ml. of water are added. The mixture is extracted with ether. The ether is stirred with isopropanol and warmed. The solid material is filtered off to give 4,4-diphenyl-3-butenohydroxamic acid.

4,4-Diphenyl-3-butenohydroxamic acid (15.7 g.) is added with stirring to 250 ml. of concentrated sulfuric acid. The resulting mixture is stirred for five minutes at room temperature, then is added to one liter of crushed ice. The mixture is stirred for five minutes. The solid material is filtered off, dried and recrystallized from acetonitrile containing a trace of dimethylformamide, using charcoal, to give 1-hydroxy-5,5-diphenyl-2-pyrrolidinone, m.p. 221°–223°.

To a solution of 3.0 g. of 1-hydroxy-5,5-diphenyl-2-pyrrolidinone in 300 ml. of ethanol is added a solution of 0.7 g. of potassium hydroxide in 50 ml. of ethanol. The mixture is warmed until complete dissolution, then 2.3 g. of 3-dimethylaminopropyl chloride is added portion-wise over a ten minute interval. The reaction mixture is refluxed for 1.5 hours then cooled and filtered. The filtrate is concentrated in vacuo and the residue is dissolved in 10% aqueous hydrochloric acid. The aqueous solution is extracted once with ether then basified with dilute aqueous sodium hydroxide and extracted three times with ether. The combined extracts are washed with water, dried (MgSO$_4$) and concentrated to give 1-[3-(N,N-dimethylamino)propoxyl]-5,5-diphenylpyrrolidin-2-one as an oil which crystallized upon chilling and trituration with hexane, m.p. 67°–68°.

EXAMPLE 2

By the procedure of Example 1, using 4,4-bis(p-methoxyphenyl)-3-butenoic acid in place of 4,4-diphenyl-3-butenoic acid, the final product is 1-[3-(N,N-dimethylamino)-propoxy]-5,5-bis(p-methoxyphenyl)pyrrolidin-2-one.

By the same procedure, using 4,4-bis(p-ethylphenyl)-3-butenoic acid as the starting material, the product is 1-[3-(N,N-dimethylamino)propoxy]-5,5-bis(p-ethylphenyl)-pyrrolidin-2-one.

EXAMPLE 3

To a mixture of 1200 ml. of dry benzene and 108 g. of sodium hydride in a 57% oil dispersion is added dropwise with stirring 25.3 g. of dry ethanol. 4-Chlorobenzophenone (475 g.) is added with stirring at 15°. The resulting mixture is stirred for 15–20 minutes, then diethyl succinate (785 g.) is added dropwise with stirring at 10°. The mixture is stirred at room temperature for 18–19 hours, then neutralized by slowly adding glacial acetic acid. The mixture is then stirred for 30 minutes and added to water. The aqueous layer is removed and extracted with ether. The extract is combined with the organic layer and 5% aqueous sodium carbonate solution is added in portions with stirring until the solution is no longer acidic. The layers are separated and the aqueous layer is acidified with dilute hydrochloric acid. The precipitate is filtered off and recrystallized from benzene-hexane to give 4-(p-chlorophenyl)-3-ethoxycarbonyl-4-phenyl-3-butenoic acid.

To 4-(p-chlorophenyl)-3-ethoxycarbonyl-4-phenyl-3-butenoic acid (537 g.) in three liters of glacial acetic acid is added 450 ml. of water followed by two liters of 48% hydrobromic acid and then an addition 450 ml. of water. The mixture is heated at reflux for 22 hours, then cooled and poured onto six liters of crushed ice. The precipitate is filtered off, then stirred with aqueous sodium carbonate solution until no carbon dioxide evolution is observed. The mixture is filtered. The filtrate is acidified and the solid material is filtered off and recrystallized from benzene-hexane to give 4-(p-chlorophenyl)-4-phenyl-3-butenoic acid.

By the procedure of Example 1, using 4-(p-chlorophenyl)-4-phenyl-3-butenoic acid as the starting material, the product is 1-[3-(N,N-dimethylamino)propoxy]-5-(p-chlorophenyl)-5-phenylpyrrolidin-2-one.

EXAMPLE 4

By the procedure of Example 3, using the following benzophenones as the starting materials:

3-bromobenzophenone
4,4'-dibromobenzophenone
2,2'-dichlorobenzophenone
4,4'-dichlorobenzophenone
4,4'-difluorobenzophenone
3,4'-dimethylbenzophenone
4,4'-dibutylbenzophenone
4-propoxybenzophenone
4-butoxybenzophenone
2-trifluoromethylbenzophenone the final products are:
1-[3-(N,N-dimethylamino)propoxy]-5-(m-bromophenyl)-5-phenylpyrrolidin-2-one
1-[3-(N,N-dimethylamino)propoxy]-5,5-bis(p-bromophenyl)pyrrolidin-2-one
1-[3-(N,N-dimethylamino)propoxy]-5,5-bis(o-chlorophenyl)pyrrolidin-2-one
1-[3-(N,N-dimethylamino)propoxy]-5,5-bis(p-chlorophenyl)pyrrolidin-2-one
1-[3-(N,N-dimethylamino)propoxy]-5,5-bis(p-fluorophenyl)pyrrolidin-2-one
1-[3-(N,N-dimethylamino)propoxy]-5-(m-tolyl)-5-(p-tolyl)pyrrolidin-2-one
1-[3-(N,N-dimethylamino)propoxy]-5,5-bis(p-butylphenyl)pyrrolidin-2-one
1-[3-(N,N-dimethylamino)propoxy]-5-phenyl-5-(propoxyphenyl)pyrrolidin-2-one
1-[3-(N,N-dimethylamino)propoxy]-5-(p-butoxyphenyl)-5-phenylpyrrolidin-2-one
1-[3-(N,N-dimethylamino)propoxy]-5-phenyl-5-(o-trifluoromethylphenyl)pyrrolidin-2-one.

EXAMPLE 5

Malonic acid (15.6 g.) and 34.5 g. of 2-(o-chlorophenyl)-2-phenylacetaldehyde are suspended in 500 ml. of toluene containing 1 ml. of piperidine. The mixture is heated at reflux for four hours while azeotroping water, then cooled to room temperature, washed with dilute hydrochloric acid and water, dried and concentrated. The residue is recrystallized from benzene-hexane to give 4-(o-chlorophenyl)-4-phenyl-3-butenoic acid.

By the procedure of Example 1, using 4-(o-chlorophenyl)-4-phenyl-3-butenoic acid as the starting material, the product is 1-[3-(N,N-dimethylamino)propoxy]-5-(o-chlorophenyl)-5-phenylpyrrolidin-2-one.

EXAMPLE 6

Substitution of a dialkylaminoalkyl chloride listed below:

2-dimethylamino chloride
2-diethylaminoethyl chloride
4-dimethylaminobutyl chloride
2-dipropylaminoethyl chloride
2-dibutylaminoethyl chloride in the procedure of Example 1 for 3-dimethylaminopropyl chloride gives the following compounds of this invention:

1-[2-(N,N-dimethylamino)ethoxy]-5,5-diphenylpyrrolidin-2-one.
1-[2-(N,N-diethylamino)ethoxy]-5,5-diphenylpyrrolidin-2-one.
1-[4-(N,N-dimethylamino)butoxy]-5,5-diphenylpyrrolidin-2-one
1-[2-(N,N-dipropylamino)ethoxy]-5,5-diphenylpyrrolidin-2-one
1-[2-(N,N-dibutylamino)ethoxy]-5,5-diphenylpyrrolidin-2-one.

What is claimed is:

1. A compound of the formula:

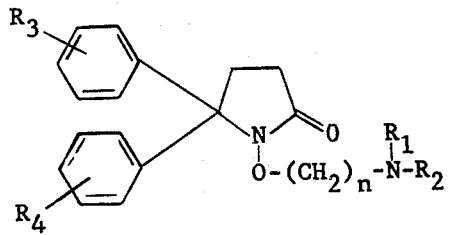

in which:
  $n$ is two to four;
  $R_1$ and $R_2$ are lower alkyl; and
  $R_3$ and $R_4$ are hydrogen, halogen, lower alkyl, lower alkoxy or trifluoromethyl.

2. A compound according to claim 1 in which $R_1$ and $R_2$ are methyl and n is three.

3. A compound according to claim 2 being the compound 1-[3-(N,N-dimethylamino)propoxy]-5,5-diphenylpyrrolidin-2-one.

* * * * *

UNITED STATES PATENT AND TRADEMARK OFFICE
CERTIFICATE OF CORRECTION

PATENT NO. : 3,896,148
DATED : July 22, 1975
INVENTOR(S) : Bernard Loev

It is certified that error appears in the above-identified patent and that said Letters Patent are hereby corrected as shown below:

Column 1, line 53, "propoxyl]" should read --propoxy]--

Column 3, line 3, "an" should read --in--

Column 4, line 67, should read --amount of solid carrier will vary widely but preferably will be--

Column 5, line 43, after "ether"(second occurrence) insert --extract-- line 68, "propoxyl]" should read --propoxy]--

Column 6, line 39, "addition" should read --additional--

Column 7, line 16, "(propoxyphenyl)" should read --(p-propoxyphenyl)-- line 43, "2-dimethylamino" should read --2-dimethylaminoethyl--

Signed and Sealed this

*thirtieth* Day of September 1975

[SEAL]

Attest:

RUTH C. MASON
*Attesting Officer*

C. MARSHALL DANN
*Commissioner of Patents and Trademarks*